Oct. 2, 1951     M. W. ROSCOE ET AL     2,569,871
PICKUP AUGER FOR SMALL GRAIN ELEVATORS
Filed Nov. 12, 1949     2 Sheets-Sheet 2
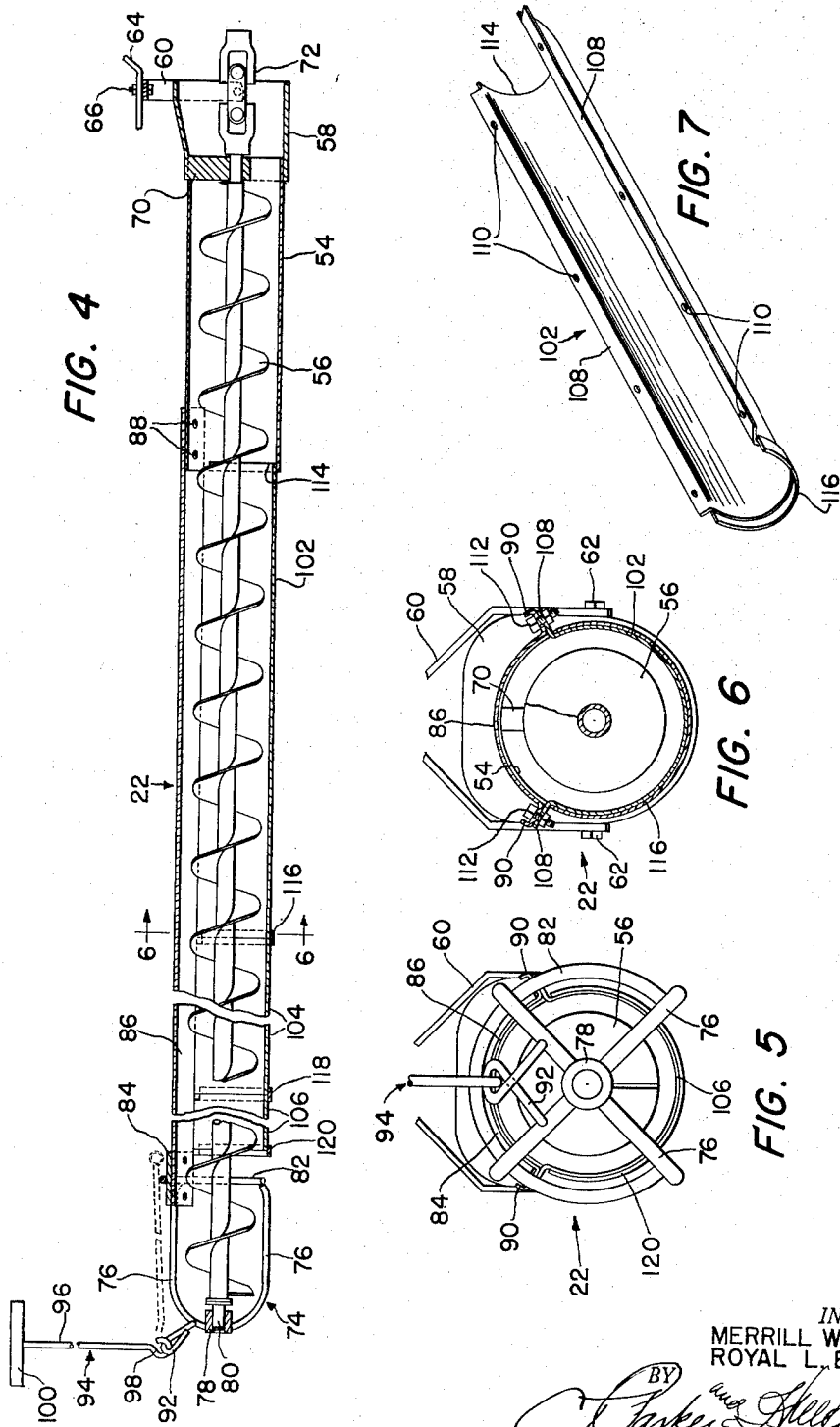
INVENTORS
MERRILL W. ROSCOE &
ROYAL L. BELDIN
ATTORNEYS Patented Oct. 2, 1951

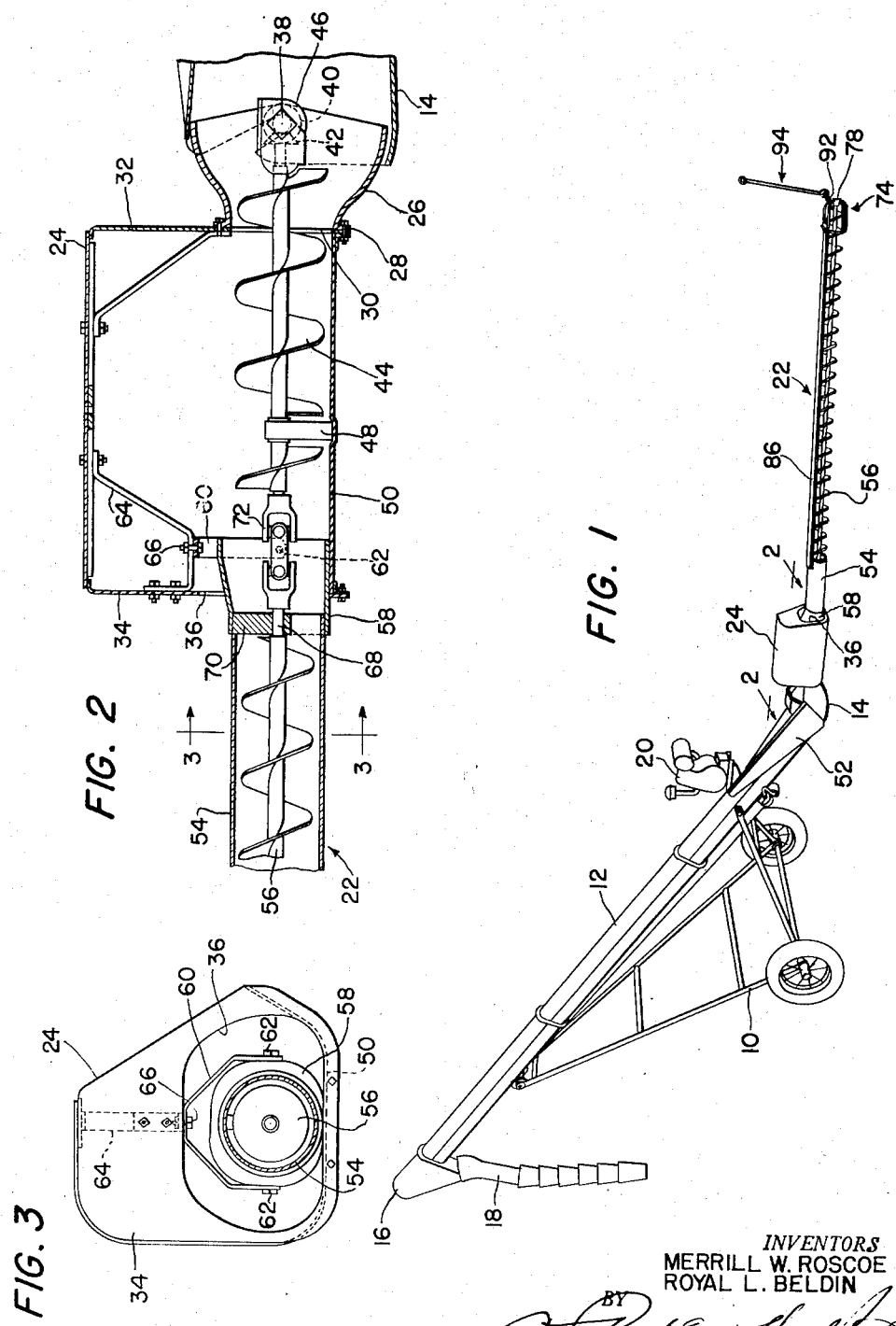

2,569,871

UNITED STATES PATENT OFFICE 2,569,871

PICKUP AUGER FOR SMALL GRAIN ELEVATORS

Merrill W. Roscoe, Moline, Ill., and Royal L. Beldin, Davenport, Iowa, assignors to Deere & Company, Moline, Ill., a corporation of Illinois Application November 12, 1949, Serial No. 126,892

10 Claims. (Cl. 198—7)

This invention relates to a material-handling device and more particularly to a grain elevator used in the handling and storing of small grains such as shelled corn and the like. Still more particularly, the invention relates to an improved pick-up auger for use with such elevator for the purpose of picking up small grain from a pile or withdrawing such grain from a bin for elevation and discharge by the elevator.

A typical small grain elevator of the type referred to generally above comprises a wheeled frame which carries an upwardly inclined elevator within which is an endless conveyor or equivalent means for moving material from a low receiving end adjacent the ground to a high discharge end disposed at such height above the ground that the material may be readily discharged into a truck, wagon, bin or other receptacle. In instances in which the material is received at the receiving end of the elevator directly from a wagon or truck for ultimate transfer to a bin, the lower end of the elevator is equipped with a hopper. In other cases, the elevator must be adapted to pick up material from a pile or to withdraw material from a storage bin. For this purpose, the hopper is removed at the lower end of the elevator and is replaced by what may be termed a pick-up auger. This auger operates to transfer material to the lower end of the elevator for ultimate elevation by the endless conveyor.

In instances in which the pick-up auger is used to withdraw material from a storage bin, the bin usually has an opening near the bottom thereof into which the auger is inserted. If the bin is relatively heavily loaded, it is not possible to insert the auger completely into the material. Therefore, it becomes expedient to enclose that portion of the auger exposed outside the bin. At the same time, it is expedient that the enclosure means for the auger be removable so that it or sections thereof may be removed as conditions make it possible for insertion of the auger farther into the bin. Furthermore, the sections should be removable when the auger is used for picking material up from a pile.

The primary object of the present invention is to provide an improved pick-up auger that will operate efficiently under all conditions such as those outlined above. Specifically, it is an object of the invention to provide a pick-up auger having a top shield for enclosing the upper portion of the auger, leaving the sides and bottom of the auger exposed. In conjunction with this top shield there is provided a plurality of removable bottom shield sections arranged in end-to-end relationship to provide, with the top shield, a generally tubular enclosure for the auger. These bottom sections are individually and sequentially removable to expose additional portions of the bottom and sides of the auger.

A still further object of the invention is to provide an improved pick-up auger construction in which one end of the auger is enclosed in a tubular housing which includes a bearing for supporting the auger shaft. The top shield extends lengthwise above the auger and is connected at its end remote from the tubular housing with a cage structure which in turn includes a bearing for the opposite end of the auger. A further object resides in the provision of a handle attached to the cage structure by means of which the operator may swing the pick-up auger in a horizontal plane to facilitate picking up of material from a pile. A subsidiary object resides in the relationship between the cage and handle, which is such that the handle, although swivelly mounted, cannot become entangled with the flights of the auger.

The foregoing and other important objects and desirable features inherent in and encompassed by the invention will become apparent as a complete disclosure is made below of a preferred embodiment of the invention, considered in connection with the accompanying sheets of drawings, in which Figure 1 is a perspective view of a typical small grain elevator equipped with a pick-up auger constructed according to the principles of the present invention;

Figure 2 is a longitudinal fragmentary sectional view of the lower end portion of the elevator and the intermediate material-transfer means, the section being viewed in the direction of the arrows 2—2 in Figure 1;

Figure 3 is an end elevational view, partly in section as viewed along the line 3—3 of Figure 2, of the intermediate material-handling means;

Figure 4 is a longitudinal sectional view through the pick-up auger, intermediate portions thereof being broken out to forshorten the view;

Figure 5 is an enlarged end view of the pick-up auger as seen from its remote or outer end;

Figure 6 is a transverse sectional view, on an enlarged scale, taken on the line 6—6 of Figure 4; and Figure 7 is a perspective view of one of the removable bottom sections.

The small grain elevator chosen for the purposes of illustration comprises a wheeled base or frame 10 on which is carried tubular elevator structure 12 having a lower or boot end 14 adjacent the ground and an upper or discharge end 16 disposed at a considerable height above the ground. A material-discharge spout 18 is associated with the discharge end 16. An endless conveyor (not shown) is contained within the tubular structure 12 for the purpose of elevating material from the boot end 14 to the discharge end 16. Power for driving the conveyor may be derived from an internal combustion engine 20.

Material is transferred to the boot end 14 for ultimate discharge at the end 16, by means of a pick-up auger 22 and intermediate material-handling means comprising a box-like structure or hopper 24. The intermediate relationship between the parts just described is shown in section in Figure 2. In this figure, it is shown that the boot end 14 of the elevator has connected thereto a bell housing 26 which is flanged at 28 and secured about an opening 30 in an end wall 32 of the hopper 24. The hopper has an opposite end wall 34 within which is formed an opening 36 into which the inner or proximate end of the pick-up auger 22 extends.

A transverse shaft 38 that interconnects the boot 14 and bell housing 26 serves, by means of a pair of meshing bevel pinions 40 and 42, to drive a short intermediate auger 44. This auger extends through the opening 30 in the end wall 32 of the hopper 24 but terminates at its other end short of the opening 36 in the opposite end wall 34 of the hopper. The end of the auger 44 adjacent the transverse shaft 38 is supported in an appropriate bearing in a gear housing 46 that encloses the bevel pinions 40 and 42. The opposite end portion of the auger is supported in a suitable bearing 48 mounted on a bottom wall 50 of the hopper 24. The shaft 38 derives power from the internal combustion engine 20, as by means (not shown) enclosed within a shield 52 (Figure 1).

The inner end of the pick-up auger 22 (that end proximate to the hopper 24) is provided with a relatively short tubular housing 54, the principal axis of which is normally horizontal, or generally horizontal, considering that the auger may be swung vertically as well as horizontally. This tubular housing provides an enclosure or trough for the inner end of an auger or helicoid 56. The inner end of the tubular housing 54 is in the form of an annular carrier 58 which is carried by a yoke 60. Opposite legs of the yoke are pivoted at 62 to opposite sides of the carrier 58, thus providing a pivot on a horizontal axis transverse to the axis of the helicoid 56. The interior of the hopper 24 includes supporting structure 64 to which the bight of the yoke 60 is pivoted at 66 (Figures 2 and 3). This pivot provides for swinging of the pick-up auger 22 through a limited range about a vertical axis. Thus, it may be said that the pick-up auger is universally connected to the receiving end of the elevator through the intermediary of the hopper 24.

The inner end of the helicoid or auger 56 has a shaft portion 68 journaled in a bearing 70 carried by the tubular structure comprising the parts 54 and 58. This shaft portion extends toward the hopper auger 44 and is connected to the shaft of the auger 44 by means of a suitable double universal joint 72. The helicoid 56 is thus driven from the hopper auger 44.

The helicoid 56 is considerably elongated over the longitudinal dimension of the tubular housing 54. The relative sizes of these parts may be seen best in Figure 1.

The outer end of the structure comprising the pick-up auger 22 as a whole comprises means forming a cage 74 preferably made up of a plurality of rods 76 bent to the shape shown and each attached at one end to a tubular member 78 that is coaxial with the helicoid 56 and that provides a bearing for an outer end shaft portion 80 of the helicoid (Figure 4). The opposite end of each rod 76 is rigidly secured, as by welding, to an arcuate, almost completely circular guard member or rod 82. The upper portion of the guard rod 82 surrounds an arcuate plate member 84 and the two parts 82 and 84 are rigidly secured together as by welding. The axial extent of the plate 84 is, of course, considerably greater than the diameter of the rod section of the guard 82. Hence, a portion of the plate 84 provides means for supporting one end of an elongated arcuate top shield 86. This shield extends longitudinally above the auger or helicoid 56 and is connected at its other end at 88 to the outer end portion of the tubular housing 54.

The opposite lengthwise terminal edges of the arcuate top shield 86 are formed as longitudinal flanges 90 (Figures 5 and 6) disposed at a level considerably above the horizontal plane including the axis of the auger or helicoid 56. Stated otherwise, the arcuate or angular extent of the top shield 86 is on the order of 120 degrees. The top shield 86 is sufficiently rigid to provide a longitudinal backbone for the pick-up auger 22; that is, it interconnects the cage 74 and the tubular housing 54, at the same time serving as an enclosure for the upper portion of the auger or helicoid 56, leaving the bottom and sides of the auger open.

The pick-up auger, to the extent thus far described, is illustrated in Figure 1, and is useful for the purpose of picking up material from piles on the ground. For that purpose, there is no need to enclose the sides or bottom of the auger or helicoid 56. The outer or remote end of the cage 74 has rigidly connected thereto a loop 92 which is preferably a metal rod of a section substantially less than that of the section of the rods 76 and 82 (Figures 4 and 5). This loop serves as means for the attachment to the cage 74 of a maneuvering handle 94. This handle, as best shown in Figure 4, comprises an elongated shank 96 having at its lower end an eye or hook 98 for engagement with the loop 92 on the cage 74. The upper or outer end of the shank 96 is provided with a transverse portion 100. As shown in dotted lines in Figure 4, the handle 94, though swivelly connected to the cage 74 by means of the loop 92 and hook 98, may be allowed to fall inwardly over the proximate end of the pick-up auger 22. Yet, the guard ring 82 prevents the handle from falling into the outer end flights of the auger 56.

Also, the height of the loop 92 contributes to the disposition of the handle 94 in such manner that it is impossible for this handle to conflict with the flights of the auger. Further, the length of the shank 96 of the handle is such that the transverse portion 100 of the handle is axially inwardly of the guard ring 82 and therefore over the structure comprising the junction of the arcuate plate member 84 and top shield 86. Hence, even though the handle is turned in such manner that the transverse portion 100 is vertical when the handle is dropped to the position indicated, the transverse portion cannot enter past the member 84. The open structure of the eye or hook 98 enables removal of the handle for use of the pick-up auger when inserted into a storage bin or the like.

For the purpose of withdrawing material from a storage bin, the pick-up auger 22 is inserted into the bin through an opening conventionally provided in the lower portion of the bin. When the bin is heavily loaded, or the material is of such nature as to pack to a greater extent than other material, it is impossible to insert the pick-up auger 22 to any considerable distance within the bin. It will be seen, therefore, that without some form of enclosure means about the sides and bottom of the auger or helicoid 56, material from the bin would flow directly out upon the ground and would not be carried by the helicoid or auger 56. On the other hand, a permanent enclosure over a substantial portion of the auger would prevent use of the auger in the picking up of material from piles. Similarly, a single removable enclosure would limit the insertion of the auger into the bin to the extent provided according to the length of such single removable enclosure.

According to the present invention, the enclosure for the bottom and sides of the auger or helicoid 56 comprises a plurality of bottom sections 102, 104 and 106. A perspective view of the section 102 appears in Figure 7. In a preferred construction, these sections are identical. The sections are arranged in end-to-end relationship with respect to each other and with respect to the outer end portion of the tubular housing 54 so that these sections, with the top shield 86, form, in effect, a continuation or extension of the tubular housing 54 to enclose the bottom and sides of the auger or helicoid 56 between the outer end portion of the tubular housing 54 and the inner portion of the cage structure 74. As best seen in Figures 5, 6 and 7, the bottom section 102 has its upper lengthwise marginal edges provided with flanges 108, and each flange has a plurality of apertures 110 for the purpose of accommodating removable securing means preferably including a plurality of bolts 112. It will be understood that the other sections 104 and 106 likewise have upper lengthwise marginal edges provided with flanges similar to the flanges 108. These flanges are likewise apertured for cooperation with the securing means.

As best seen in Figure 7, the flanges 108 on the section 102 terminate short of the inner or right-hand end (as viewed in the figure) of the section. The radius about which the section is formed is slightly less than the radius of the interior of the tubular housing 54. This end of the section 102 may be termed its supported end and is designated by the numeral 114. This end portion 114 is received within and supported by the proximate end portion of the tubular housing 54.

The other end portion of the section 102 is provided with an arcuate supporting band 116, therefore giving the section 102 what may be termed a supporting end. The band 116 surrounds the outside of the section so that this section can support the proximate end of the adjacent section 104. The opposite end of the section 104 has a similar band 118 which functions to support the proximate end of the section 106. The opposite end of the section 106 has a band 120 identical to the bands 116 and 118. This band, in the particular assembly illustrated, has no function but is provided on the section 106 merely because the sections are identical and therefore interchangeable.

When the pick-up auger is used in connection with the withdrawing of material from the bin, all the sections may be assembled as shown in Figure 4 so that only the caged end of the auger is exposed. Hence, the helicoid or auger 56 may operate to withdraw an initial quantity of material from the bin. As the transfer of material progresses, and it becomes evident that the capacity of the auger 56 could be increased, the operation may be suspended and the shield 106 removed, thereupon permitting further insertion of the pick-up auger 22 into the bin. As the work progresses, it may become apparent or necessary that one or both of the remaining shields 104 and 102 could be removed to facilitate or increase the efficiency of the material-transferring operation.

The improved pick-up auger 22 is characterized by its simplicity in construction and design and lends itself to efficient functioning. The rigidity of the structure without the sections 102, 104 and 106 is sufficiently provided for by the top shield 86, which is of some importance in making the weight of the pick-up auger as light as possible for operations involving the picking up of material from a pile, since the auger must, in this phase of its operation, be moved laterally about the pivot 66. This movement is, of course, accomplished manually by means of the handle 94. When the pick-up auger is used for the withdrawal of grain from a bin, the outlet opening in the bin is usually at a distance somewhat above the ground, thus requiring that the auger extend a considerable distance between the bin and the hopper 24 without any intermediate support. However, the addition to the auger of the sections 102, 104 and 106 increases the rigidity of the structure. As the sections are removed and the auger is inserted farther into the bin, the need for increased rigidity diminishes. Hence, rigidity of the pick-up auger 22 in bin unloading is directly proportionate to the number of sections used.

Other important features and objects of the invention not specifically enumerated above will undoubtedly occur to those versed in the art, as likewise will numerous modifications and alterations in the preferred embodiment disclosed, all of which may be achieved without departing from the spirit and scope of the invention as defined in the appended claims.

What is claimed is:

1. A pick-up conveyor for a grain elevator or the like, comprising: a tubular housing normally positioned with its principal axis generally horizontal; means providing a bearing within the housing and on said axis; an elongated auger extending axially through the housing, having an inner, housing-proximate end portion journaled in said bearing and an opposite, outer end portion relatively axially remote from the housing; an elongated continuous top shield extending above and lengthwise of the auger and having an inner end portion fixed to the housing and an opposite, outer end portion proximate to the outer end portion of the auger; said top shield having opposite, lengthwise marginal edge portions disposed at a level above a generally horizontal plane passed through the axis of the auger, so that the sides and under portion of the auger are exposed; outer end structure fixed to the outer end portion of the top shield and including a bearing for the outer end of the auger; a plurality of separable U-shaped bottom shield sections, each shorter than the total length of the top shield and positionable in selectively different end-to-end relationship combinations below the auger and beginning at the tubular housing to form a continuation of the tubular housing in varying lengths for enclosing the bottom and sides of said auger over selectively different lengthwise portions thereof between the tubular housing and the outer end portion thereof, each bottom shield section having upper, lengthwise marginal edge portions proximate to the top shield marginal edge portions; and means for removably securing the bottom shield sections separately to the top shield.

2. The invention defined in claim 1, further characterized in that: the top shield is arcuate in section generally about the axis of the auger and extends angularly through less than 180 degrees, and each bottom section is arcuate generally about the axis of the auger and extends angularly a sufficient distance to complement the top shield so as to provide generally a tubular extension of the tubular housing.

3. The invention defined in claim 2, further characterized in that: the arcuate extent of the top shield is on the order of 120 degrees and that of each bottom shield section is on the order of 240 degrees.

4. A pick-up conveyor for a grain elevator or the like, comprising: a tubular housing normally positioned with its principal axis generally horizontal; means providing a bearing coaxial with and adjacent the housing; an elongated auger extending axially from the housing, having an inner, housing-proximate end portion journaled in said bearing and an opposite, outer end portion relatively axially remote from the housing; an elongated continuous top shield extending above and lengthwise of the auger and having an inner end portion fixed to the housing and an opposite, outer end portion proximate to the outer end portion of the auger, said top shield covering primarily the top portion of the auger so that the sides and under portion of the auger are exposed; outer end structure fixed to the outer end portion of the top shield and including a bearing for the outer end of the auger; a U-shaped bottom shield section shorter than the total length of the top shield and positionable below the auger in end-to-end relationship with and to form a continuation of the tubular housing for enclosing the bottom and sides of said auger over a substantial portion thereof less than the total distance between the tubular housing and the outer end portion thereof, said bottom shield section having upper, lengthwise marginal edge portions proximate to opposite sides of the top shield; and means for removably securing the bottom shield section to the top shield.

5. A pick-up conveyor for a grain elevator or the like, comprising: an elongated, normally horizontally operated auger having coaxial shaft portions one adjacent the inner end and the other adjacent the outer end thereof; means of relatively short length, as respects the length of the auger, providing a trough at the inner end portion of the auger and including a bearing journaling the auger shaft portion at said inner end; means at the outer end of the auger providing a cage coaxial with the auger and confined substantially to said outer end, said cage having a bearing journaling the adjacent shaft portion of the auger and further having an arcuate guard generally concentric with the auger and disposed in protective relationship above said outer end of the auger, said guard being spaced axially inwardly a relatively short distance from said outer end bearing; an elongated shield extending over the auger between and having opposite end portions fixed respectively to the guard and to the trough means; and a handle swivelly connected to the cage adjacent the outer end bearing to normally extend upwardly therefrom but foldable downwardly, said handle being of a length greater than the axial spacing between said outer end bearing and the guard whereby the guard prevents the handle from entering the outer end of the auger.

6. A pick-up conveyor for a grain elevator or the like, comprising: an elongated, normally horizontaly operated auger having coaxial shaft portions, one adjacent the inner end and the other adjacent the outer end thereof; means of relatively short length, as respects the length of the auger, providing a trough at the inner end portion of the auger and including a bearing journaling the auger shaft portion at said inner end; means at the outer end of the auger providing a cage coaxial with the auger and confined substantially to said outer end, said cage having a bearing journaling the adjacent shaft portion of the auger and further having guard bars extending axially inwardly from said outer end bearing and disposed in protective relationship about said outer end of the auger; an elongated shield extending over the auger between the guard and the trough and having one end fixed to the trough and its opposite end fixed to the cage at a point spaced axially inwardly of said outer end bearing; and a handle swivelly connected to the cage adjacent the outer end bearing to normally extend upwardly therefrom but foldable downwardly, said handle being of a length greater than the axial spacing between said outer end bearing and the adjacent end of the shield whereby the shield prevents the handle from entering the outer end of the auger.

7. For a pick-up conveyor of the class described: a tubular housing normally positioned with its axis generally horizontal; a relatively long continuous top shield secured at one end to an upper portion of one end of the housing and extending away therefrom generally as a continuation thereof to dispose its other end remote from the housing, said top shield having opposite, lengthwise margnial edges disposed at a level above a horizontal plane passed through the axis of the tube; a plurality of separable U-shaped bottom shield sections, each shorter than the total length of the top shield and positionable in selectively different end-to-end combinations beneath the top shield to form with the top shield generally a tubular extension of the housing in varying lengths, each bottom shield section having upper, lengthwise marginal edges respectively cooperative with the marginal edges of the top shield; and means for removably securing the bottom shield sections separately to the top shield.

8. The invention defined in claim 7, further characterized in that: the top shield is arcuate in section generally about the axis of the housing and extends angularly through a distance less than 180 degrees, and each bottom section is arcuate generally about the axis of the housing and extends angularly a sufficient distance to complement the top shield in forming the tubular extension of the housing.

9. The invention defined in claim 8, further characterized in that: the arcuate extent of the top shield is on the order of 120 degrees and that of each bottom shield section is on the order of 240 degrees.

10. For a pick-up conveyor of the class described: a tubular housing normally positioned with its axis generally horizontal; a relatively long continuous top shield secured at one end to an upper portion of one end of the housing and extending away therefrom generally as a continuation thereof to dispose its other end remote from the housing, said top shield having opposite, lengthwise marginal edges disposed at a level above a horizontal plane passed through the axis of the tube; a U-shaped bottom shield section shorter than the total length of the top shield and positionable beneath the top shield and in end-to-end relationship with the housing to form with the top shield generally a tubular extension of the housing terminating short of the outer end of the top shield, said bottom shield section having upper, lengthwise marginal edges respectively cooperative with the marginal edges of the top shield; and means for removably securing the bottom shield section to the top shield.

MERRILL W. ROSCOE.
ROYAL L. BELDIN.

REFERENCES CITED

The following references are of record in the file of this patent:

UNITED STATES PATENTS

| Number | Name | Date |
|---|---|---|
| 2,059,705 | Moeller | Nov. 3, 1936 |
| 2,279,201 | Kozak et al. | Apr. 7, 1942 |
| 2,393,572 | Soma | Jan. 22, 1946 |
| 2,465,145 | Brainerd | Mar. 22, 1949 |
| 2,467,682 | Megargee | Apr. 19, 1949 |
| 2,483,290 | Mayrath | Sept. 27, 1949 |
| 2,528,679 | Ballard et al. | Nov. 7, 1950 |